Dec. 22, 1936.　　　　W. R. KNAPP　　　　2,064,838
PROCESS FOR THE RECOVERY OF ACID GASES
Filed Feb. 28, 1934
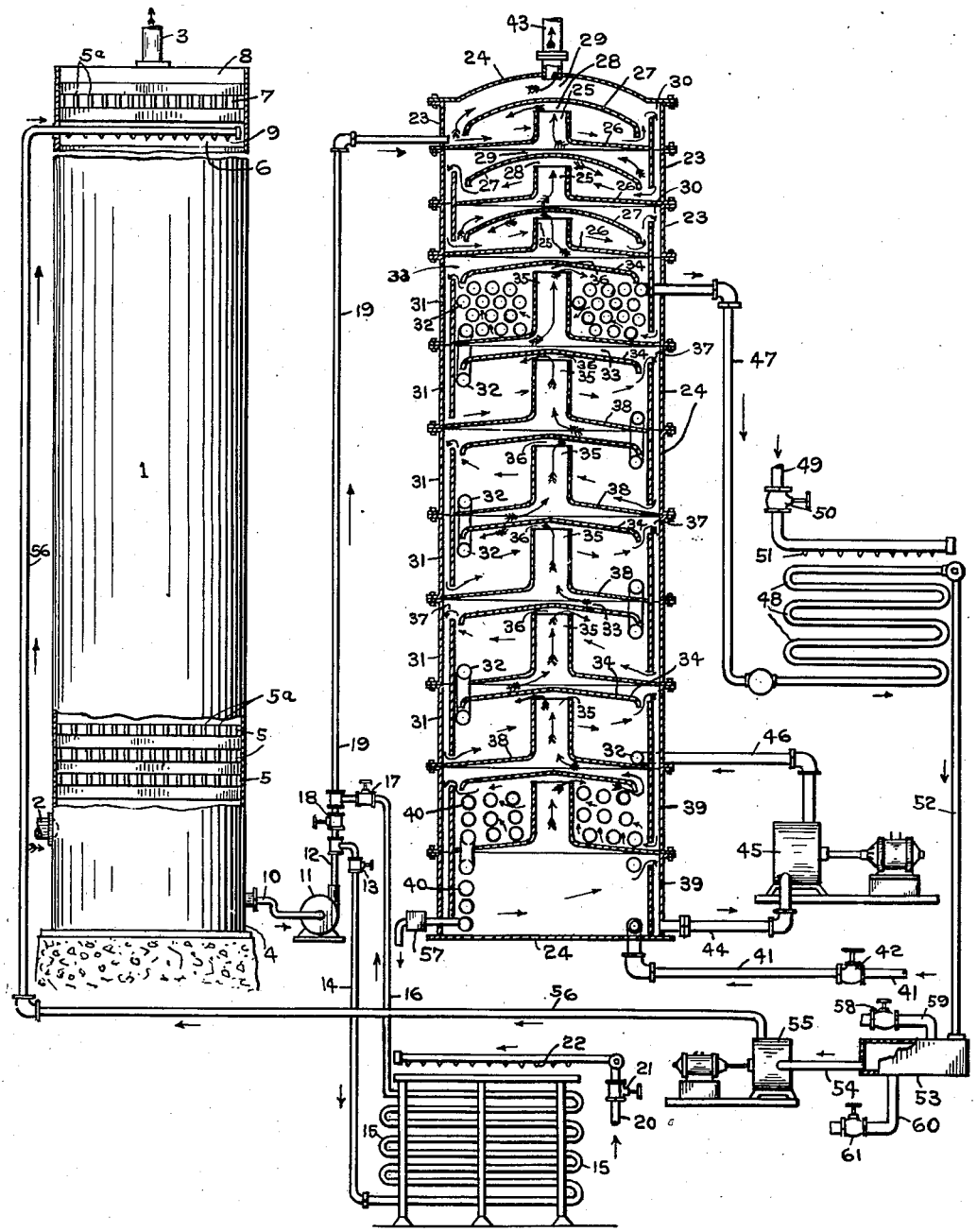

Patented Dec. 22, 1936

2,064,838

UNITED STATES PATENT OFFICE 2,064,838

PROCESS FOR THE RECOVERY OF ACID GASES

Walter R. Knapp, Pelham, N. Y., assignor, by mesne assignments, to Horvitz Patent Holding Corporation, New York, N. Y., a corporation of New York Application February 28, 1934, Serial No. 713,311

10 Claims. (Cl. 23—2)

This invention relates to a process for the recovery of acid gases from gas mixtures and for the removal of acid gas impurities from industrial gases and its novelty consists in the steps of the process.

There are many acid gases having a commercial value that are daily lost with gaseous mixtures passing to the atmosphere that at present are considered only as waste gases of commercial industries.

There is no process except the process covered by United States Patent No. 1,916,980 available to save, recover or clean these valuable acid gases, that is commercially practicable.

My process furnishes a practical economical method of recovering acid gases from many chemical and industrial operations making such acid gases available at a low cost and also furnishes a process for the purification of industrial gases from said gas at a low cost.

This process has a higher efficiency of removal and recovery of said acid gases than any of the processes now in commercial use and requires relatively a smaller amount of external heat, the amount of heat varying somewhat with the nature of the acid gas removed or recovered.

The process may be applied to the separation and recovery of such gases as carbon dioxide, sulphur dioxide, hydrogen cyanide, hydrogen sulphide or any other gas of acid reaction either organic or inorganic from waste gases. The process may also be applied to the removal of acid gases from industrial gases such as coal gas, water gas, or cracker gas as produced in oil refining operations where said acid gases are present as an obnoxious impurity, or from smelting or other chemical operations where air pollution is undesirable.

In order to make the process clear and comprehensible I will apply it to the removal of carbon dioxide from the waste gases of combustion and will set forth all the steps of the process together with all the chemical reactions and changes which occur so that those skilled in the art will be able to utilize my process in commercial practice.

Referring to the drawing, there is a single diagrammatic figure showing the operation of the process as applied to the recovery of carbon dioxide gas from gaseous mixtures such as the waste gases of combustion from a steam boiler plant.

It will be understood that the various parts of the apparatus for carrying out the process as described are merely indicated in a diagrammatic manner in order to show the complete cycle of operation involved in this particular example of the process as described and claimed.

The various parts of the apparatus are named in accordance with the particular function of the apparatus used in carrying out the process and the chemical elements and reactions resulting in chemical changes are named at the particular portion of the apparatus where the changes occur, so that an examination of the diagrammatic drawing will indicate clearly and definitely the particular apparatus used and the connection between the same and the chemical elements and combinations in each part of the apparatus.

Referring to the diagrammatic drawing, the hot waste gas mixture is taken from the breeching or smoke stack of a commercial steam boiler plant (not shown). It will be understood that this source of supply is used only as an example and that this invention is not restricted to that source of supply but that other sources of supply may be used, such as gases of fermentation, gases from kilns, gases from smelting and other acid gases besides carbon dioxide can be so recovered. Such a waste gas mixture is taken by means of a positive type exhauster or fan (not shown) through a cooler or condenser (not shown), through a sulphur dioxide absorber (not shown), through a dirt, soot and fly ash removal apparatus (not shown) and enters a carbon dioxide absorber 1 through the inlet pipe 2 located near the base of the carbon dioxide absorber. It then passes through the carbon dioxide absorber 1, where the carbon dioxide content of the flue gas is absorbed, with the washed flue gas passing out the absorber at the top through outlet pipe 3 and discharged from the outlet 3 to the atmosphere, or to a plant for the use of the resultant practically pure nitrogen gas. This is the extent of the gas cycle and it is essential that the temperature of the gas or circulation medium in the absorber 1 never exceeds 108° F. and preferably said temperature should not exceed 90° F.

The carbon dioxide absorber 1 is a tower of sufficient height to permit the completion of the reaction between the absorption medium and the acid gas with the diameter proportioned to keep a stated velocity of gas passing through the apparatus. The base 4 of the absorber 1 is used as a reservoir to compensate for fluctuations in the amount of circulation.

Starting at a point above the gas inlet 2 of the absorber 1 the absorber 1 is filled within a few feet of the top with wooden grids 5 or hurdles made of chemical stoneware or any other inert material which can be arranged to maintain a uniform distribution of the gas and liquor. Above the grids 5 is a gas space 6 utilized as a spray chamber and above this space 6 is a series of dry grids 7 identical in construction to grids 5, with a gas space 8 at the top of the absorber 1 where the velocity of the gas is reduced thus minimizing the probability of any water or absorption solution being mechanically carried from the absorber 1 with the gas.

In the base 4 of the absorber 1 the sulphur and dirt free flue gas is introduced through the inlet pipe 2 and passes up through the interstices 5a of the grids 5 countercurrent to a substantially twenty-five percent solution of mono sodium diammonium phosphate introduced through sprays 9. The temperature in absorber 1 is so controlled and maintained that the temperature of the liquor never exceeds 108° F. and is preferably maintained at approximately 90° F.

The solution of sodium diammonium phosphate is partially dissociated in the presence of carbon dioxide gas, one molecule of the ammonia separating from the salt, uniting in the presence of water with one molecule of carbon dioxide and forming ammonium bicarbonate, as expressed in the following equations:

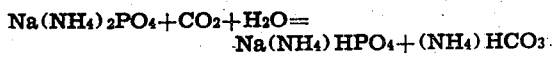
$$Na(NH_4)_2PO_4+CO_2+H_2O=$$
$$Na(NH_4)HPO_4+(NH_4)HCO_3$$

$$2Na(NH_4)_2PO_4+CO_2+H_2O=$$
$$2Na(NH_4)HPO_4+(NH_4)_2CO_3$$

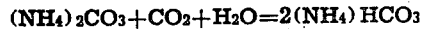
$$(NH_4)_2CO_3+CO_2+H_2O=2(NH_4)HCO_3$$

The mono sodium diammonium phosphate solution can be of any strength from a very dilute solution up to a saturated solution at the temperature of circulation. It is however preferable to use a solution containing thirty-three and one-third parts of sodium diammonium phosphate calculated as the anhydrous salt, (without water of crystallization) to one hundred parts of water by weight. This is approximately a twenty-five percent solution based on the anhydrous salt (without water of crystallization). I also prefer to have the amount of mono sodium diammonium phosphate solution circulated slightly in excess of the theoretical requirements, thus permitting a small proportion of ammonium carbonate to be formed as expressed in the following equation:

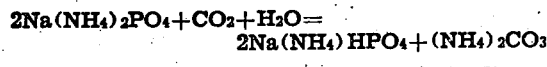
$$2Na(NH_4)_2PO_4+CO_2+H_2O=$$
$$2Na(NH_4)HPO_4+(NH_4)_2CO_3$$

From the base 4 of the absorber 1 the liquor containing ammonium bicarbonate, ammonium carbonate and sodium ammonium acid phosphate passes through pipe 10 to pump 11, automatically controlled (not shown) by the height of the liquor in the base 4 of the absorber 1. The pump 11 with valve 18 closed forces the liquor through pipe 12, valve 13, pipe 14, to a series of two inch cooling coils 15, cooled by water flowing from an outside source 20 through valve 21 and sprays 22 over the outside surfaces of the coils 15. And the liquor then passes through pipe 16, valve 17 and pipe 19 to the bottom of the top ring 23 of the regenerator 24. The function of the cooling coils 15 is to insure that the temperature of the liquor feeding the regenerator 24 never exceeds 90° F. These coils 15 are essential only during extremely hot summer days and can be bypassed by opening valve 18 and closing valves 13 and 17 when not essential for the maintenance of the desired temperature.

The regenerator 24 as illustrated consists of eleven rings constructed of acid and alkali resisting metal, preferably of copper free cast aluminum.

The three top rings 23 are dephlegmator rings, each ring 23 having a phophone 25 through the floor 26, extending slightly above the liquor level of said ring 23. Over the phophone 25 is an arched passette 27 so arranged as to give ample passage for gas and vapors from said phophone 25 with the passette 27 curving downward, so that the edge of the passette 27 is substantially immersed below the surface of the liquor. This passette 27 separates the gas space of the ring 23 into two zones 28 and 29. The space 28 under the passette being connected through the phophone 25 with the top gas space 29 of the ring 23 below. Thus all gas or vapor generated in the ring 23 has to bubble through the liquor in the ring 23 above, thus heating the incoming liquor and cooling the gas and vapors.

Each of the three rings 23 is connected with the next adjacent ring 23 by an internal overflow 30, the top of which is slightly below the top of phophone 25 and extends to within a short distance of the floor 26 of the next lower ring 23. In the lowest dephlegmator ring 23 the phophone 25 connects the gas space 28 of ring 23 with a top gas space 33 of ring 31 and the overflow 30 of said ring 23 extends to within a short distance of floor 38 of said ring 31.

Below the dephlegmator rings 23 are six rings 31 filled with heating tubes 32 so designed that the heating tubes 32 are at all times immersed in the circulating liquor, with a small gas space 33 above a passette 34 and which space is connected by a phophone 35 to a gas space 36 on the underside of the passette 34 in the ring 31 above. The edge of the arched passette 34 is slightly immersed in the liquor, thus separating the gas space into two separate and distinct zones 33 and 36 causing the escaping gas and vapor to be washed in the downcoming liquor of the ring 31 above. Each of the six rings 31 is connected with the next adjacent ring 31 by an internal overflow 37, the top edge of which is slightly below the level of the top edge of phophone 35 and slightly above the top row of tubes 32 and extends to within a short distance of the floor 38 of the next lower ring 31. In each ring 31 are a number of rows of tubes 32, and the tubes 32 in each horizontal layer are connected with a header and the header so arranged that a number of adjacent tubes are in parallel and connected in series with a similar number of tubes 32 in the same horizontal layer. The last series of parallel tubes 32 in any horizontal layer are connected by a header to a similar series of tubes 32 in the next horizontal layer and the last series of tubes 32 in any ring are connected by a header to a similar series of tubes 32 in the next ring 31. This arrangement is continued throughout the six rings 31 of the regenerator 24 so that all the tubes 32 of the six rings 31 are in series of parallel tubes.

The last two rings 39 of the regenerator 24 are tube rings similar in design to the rings 31 above, with phophone 35 and overflow 37 functioning as in rings 31 and connecting the lowest ring 31 to the ring 39. The heating tubes 40 of rings 39 are independent of heating tubes of rings 31 and are connected with a live steam supply pipe 41, the inlet valve 42 of which is mechanically controlled by a temperature regulator (not shown), thus insuring a uniform automatically controlled temperature. The water condensed in said tubes 40 is drawn off through steam trap 57 to the sewer or to the hot well of the steam plant (not shown).

The ammonium bicarbonate, ammonium carbonate and sodium ammonium acid phosphate solution enters the top dephlegmator ring 23 at a temperature of approximately 90° F. flows down in series through the three rings 23, the solution in passing through the rings 23 is slightly heated by the upcoming gas and vapor and then flows through in series the first six heating rings 31, where the solution is further heated by the circulation in the tubes 32 of the hot effluent from the base of the regenerator 24 and the solution then passes through the last two rings 39 in series where the circulation solution is heated to a temperature sufficient to dissociate the residual ammonium carbonate by means of the heat furnished by the live steam in the heating tubes 40.

In the regenerator 24 several reactions take place. The ammonium bicarbonate and carbonate are dissociated into ammonia and carbon dioxide in the hot zones near the bottom of the apparatus and part of the free ammonia unites with the sodium ammonium acid phosphate to form mono sodium diammonium phosphate, as expressed in the following equation:

$$2(NH_4)HCO_3 \rightleftarrows 2NH_3 + 2CO_2 + 2H_2O$$

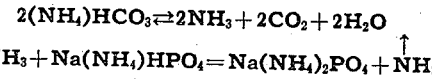

The balance of the dissociated ammonia and all of the carbon dioxide passing up from a hot zone of the regenerator 24 to a cooler zone of the regenerator 24, tends to reunite forming ammonium carbonate with part of the CO₂ passing up and escaping from the regenerator 24 through the outlet pipe 43 at the top of 24 which outlet pipe leads to a container (not shown). This reaction can be expressed as follows:

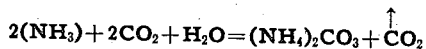

This ammonium carbonate formed dissolves in the downcoming liquor and is returned to a hotter zone of the regenerator 24 where it is again dissociated into ammonia and carbon dioxide as follows:

$$(NH_4)_2CO_3 \rightleftarrows 2NH_3 + CO_2 + H_2O$$

Part of the ammonia unites with the mono sodium ammonium phosphate to form mono sodium diammonium phosphate,

and the balance passes up the regenerator 24 to form ammonium carbonate which is redissolved and returns to a hotter zone.

This dissociation and reforming of the carbonate continues until an equilibrium is established in the regenerator 24, which varies in accordance with the temperature maintained in the top ring 23 and the temperature maintained in the base ring 39.

With the maintenance of the carbon dioxide gas in the top ring 23 at a temperature of not to exceed 108° F. practically no ammonia vapor will pass off with the carbon dioxide gas and the gas will be practically pure carbon dioxide saturated with water vapor at the temperature of exit through outlet pipe 43. However, with the gas temperature at the outlet 43 above 108° F. some ammonia vapor will pass off with the carbon dioxide. As the temperature is raised at the outlet 43 more and more of the ammonia passes off with the carbon dioxide until with a gas temperature at the outlet 43 of approximately 184° F. and with the liquor in the base ring 39 of the regenerator 24 at a temperature in excess of 210° F. substantially all of the ammonia and of the carbon dioxide content of the circulation liquor will pass off through the outlet 43 as a vapor from the regenerator 24.

Thus it will be seen that for the successful working of this invention it is essential that the gas temperature at the outlet 43 never exceeds 108° F. and the temperature of the circulating liquor leaving the regenerator 24 through outlet pipe 44 never exceeds a temperature sufficient to completely dissociate the residual ammonium carbonate.

With the maintenance of a gas temperature at the outlet 43 of 90° F. and a liquor temperature at outlet pipe 44 of 210° F. an equilibrium is established in the regenerator 24 with the liquor leaving the regenerator 24 containing approximately twenty-five percent of the incoming ammonia which was combined with carbon dioxide, leaving as ammonium carbonate. Thus in the first cycle of the circulation liquor approximately eighty-seven and one-half percent of the carbon dioxide absorbed in the absorber 1 will be eliminated in the regenerator 24 and in each subsequent cycle one hundred percent of the carbon dioxide absorbed from the gas in the carbon dioxide absorber 1 will be eliminated in the regenerator 24.

Thus with the original circulation liquor containing the preferable strength of approximately 31.5 parts by weight of mono sodium diammonium phosphate (calculated without water of crystallization) to one hundred parts of water by weight. the circulation liquor leaving the regenerator 24 will contain by calculation approximately 25.12 parts by weight of mono sodium diammonium phosphate, 7.45 parts of sodium ammonium acid phosphate and 2.50 parts of ammonium carbonate, and is the preferable solution for the absorption of the carbon dioxide in the carbon dioxide absorber 1 although it is to be understood that solutions of other strength either weaker or stronger, may be used, and this is the solution that is referred to as a "twenty-five percent solution calculated as mono sodium diammonium phosphate" in describing the absorber 1 cycle The preferable circulation liquor which is designated as a twenty-five percent mono sodium diammonium phosphate liquor is approximately of the following composition:

| | Percent by weight |
|---|---|
| Mono sodium diammonium phosphate | 18.55 |
| Sodium ammonium acid phosphate | 5.52 |
| Ammonium carbonate | 1.85 |
| Water | 74.08 |

But it is understood that a liquor of this composition is not essential to the successful operation of this process but can be varied over wide limits without materially affecting the results obtained.

The hot liquor at 210° F. discharges from the regenerator 24 through the outlet pipe 44 to the pump 45. The pump 45 is automatically controlled by a carbon dioxide indicator (not shown) on the outlet 3 of the carbon dioxide absorber 1, with a limit switch (not shown) governed by the height of liquor in the base ring 39 of the regenerator 24. The carbon dioxide control functions to assure sufficient circulation for the removal of the carbon dioxide from the flue gas, and the limit switch functions to assure that the entire circulation is in equilibrium before any further impulses from the carbon dioxide indicator are answered by the pump 45.

The pump 45 forces the circulation liquor through pipe 46 to the heating tubes 32 of the lowest ring 31 which is the third ring from the bottom of the regenerator 24, and the liquor flows through the six liquor heating rings 31 being cooled in its passage through the tubes 32 and transferring its heat to the liquor in the body of the regenerator 24. The liquor leaves the tubes 32 of the top heating ring 31 at approximately 110° F. and then passes through pipe 47 to a series of two inch cooling coils 48 cooled by a stream of water flowing over the outside surfaces of the coils 48 from an outside source 49, through valve 50 and sprays 51. The circulation liquor now cooled to approximately 90° F. passes from cooling coils 48 through pipe 52 to a collector tank 53 broken away to show the interior construction and from said tank 53 through pipe 54 is pumped by pump 55 through pipe 56 to the sprays 9 of the carbon dioxide absorber 1. This pump is synchronized with the pump at the base of regenerator 24. Any deficiency in the quantity of the circulation liquor is made up by introducing from an outside source fresh solution of sodium diammonium phosphate into collector tank 53 through valve 58 and pipe 59. Any excess of said solution of sodium diammonium phosphate over circulation requirements is removed from collector tank 53 through pipe 60 and valve 61. This completes the cycle of the absorption circulation medium.

The lower two heating rings 39 of the regenerator 24 are connected through pipe 41 and valve 42 to an outside steam supply. The valve 42 is automatically controlled by a temperature controller (not shown), the thermometer bulb of which is located in the gas space 29 of the top dephlegmator ring 23. This insures the maintenance of the proper and uniform temperature at all times.

The carbon dioxide gas liberated in the regenerator 24 passes up through the various rings 39, 31 and 23 and is washed by the downcoming sodium ammonium acid phosphate, which frees it of any entrained ammonia vapor and is cooled by the entering liquor and finally passes through outlet pipe 43 to the point of consumption or to a storage holder (not shown).

The carbon dioxide produced in accordance with the above description is practically chemically pure, contains no ammonia vapor, contains no entrained water, but only the water of saturation at the temperature of the said gas leaving regenerator 24 through outlet pipe 43. Therefore the carbon dioxide gas requires no extensive dehydration or cooling systems to prepare it for subsequent processes.

With the use of this process as described acid gases can be removed and recovered with the use of a comparatively small amount of external heat. The amount of heat required is between 250 and 1000 British thermal units per pound of the acid gas recovered. This heat can be furnished by means of live steam, exhaust steam or hot industrial gases. The operation can be made entirely mechanical requiring very little supervision. For a stated production of carbon dioxide gas, the speed of the exhauster (not shown) can be controlled by a carbon dioxide recorder (not shown) on the absorber inlet pipe 2, the speed of the circulation pump 11 is controlled by a carbon dioxide recorder (not shown) on the gas outlet pipe 3 of the carbon dioxide absorber 1. The temperature of the regenerator 24 is maintained by a temperature controller (not shown).

It is to be definitely understood that whereas carbon dioxide is treated as the gas to be recovered, this process applies to both organic and inorganic acid gases such as hydrogen sulphide $H_2S$, hydrocyanic acid gas HCN and mercaptans $C_nH_{2n}S_2$. It is also to be definitely understood that any acid salt solution containing more than two hydrogen ions can be used, in the place of the mono sodium diammonium phosphate used as an example. Also it is to be understood that the process is not restricted to the use of sodium as the base of the salt but any other tri-basic diammonium phosphate of an alkali or alkaline earth metal may be used such as potassium, lithium, magnesium and strontium diammonium phosphate.

I claim:

1. A process for the removal of acid gases from industrial waste gas containing same by means of a mixed salt of the class consisting of tri-basic diammonium phosphates of the alkali metals and alkaline earth metals and the subsequent recovery of the acid gas by regeneration of the mixed salt.

2. A process of purifying natural gas by removing acid gas constituents by scrubbing the natural gas mixture with a solution of a mixed salt of the class consisting of tri-basic diammonium phosphates of the alkali metals and alkaline earth metals and the subsequent recovery of the acid gas by regeneration of the mixed salt.

3. A process of purifying manufactured gas by removing acid gas constituents by scrubbing the manufactured gas mixture with a solution of a mixed salt of the class consisting of tri-basic diammonium phosphates of the alkali metals and alkaline earth metals and the subsequent recovery of the acid gas by regeneration of the mixed salt.

4. A process for the removal of acid gases from industrial waste gases containing as a constituent acid gas which consists in scrubbing said waste gas with a solution of a mixed salt of the class consisting of tri-basic diammonium phosphates of the alkali metals and alkaline earth metals which decomposes in the presence of an acid gas forming an acid salt of the scrubbing medium and an acid salt of the acid gas and the removal of the resultant solution from the scrubbing chamber to a heating chamber wherein the said acid salt of the acid gas is decomposed by heat with the acid gas passing from the top of the heating chamber to a holder and the base of the acid salt of the acid gas uniting with the acid salt of the scrubbing medium forming said mixed salt which after cooling is recycled in the scrubbing chamber.

5. A process for the removal of acid gas from a gaseous mixture containing acid gas as a constituent by contacting the same with sodium diammonium phosphate and the subsequent recovery of the acid gas by regeneration of the sodium diammonium phosphate.

6. A process of purifying natural gas by removing acid gas constituents by scrubbing the natural gas mixture with a solution of sodium diammonium phosphate, and the subsequent recovery of the acid gas by regeneration of the sodium diammonium phosphate.

7. A process of purifying manufactured gas by removing acid gas constituents by scrubbing the manufactured gas mixture with a solution of sodium diammonium phosphate, and the subsequent recovery of the acid gas by regeneration of the sodium diammonium phosphate.

8. A process for the removal of acid gases from industrial waste gases containing as a constituent acid gas which consists in scrubbing said waste gas with a solution of sodium diammonium phosphate which decomposes in the presence of an acid gas forming an acid salt of the scrubbing medium and an acid salt of the volatile base and the acid gas and the removal of the resultant solution from the scrubbing chamber to a heating chamber wherein the said acid salt of the acid gas is decomposed by heat with the acid gas passing from the top of the heating chamber to a holder and the volatile base of the acid salt of the acid gas uniting with the acid salt of the scrubbing medium forming sodium diammonium phosphate which after cooling is recycled in the scrubbing chamber.

9. A process of removing acid gas from a gaseous mixture containing acid gas as a constituent comprising scrubbing said gaseous mixture with a solution of a mixed salt of the class consisting of tri-basic diammonium phosphates of the alkali metals and alkaline earth metals, acid containing more than two hydrogen ions and the removal of the resultant solution to a regeneration chamber where the temperature of the regenerator acid gas outlet does not exceed 108° F.

10. A process of removing acid gas from a gaseous mixture containing acid gas as a constituent comprising scrubbing said gaseous mixture with a solution of sodium diammonium phosphate and the removal of the resultant solution to a regeneration chamber where the temperature of the regenerator acid gas in the top zone does not exceed 108° F.

WALTER R. KNAPP.